Oct. 20, 1964    F. P. ACHORN ETAL    3,153,574
PRODUCTION OF GRANULAR DIAMMONIUM PHOSPHATES
Filed Dec. 8, 1960    2 Sheets-Sheet 1

Frank P. Achorn
Ronald D. Young   INVENTORS.
Gordon G. Hicks
BY Robert A. Petrusek
Agent and
United States Patent Office 3,153,574
Patented Oct. 20, 1964

3,153,574
PRODUCTION OF GRANULAR DIAMMONIUM PHOSPHATES
Frank P. Achorn and Ronald D. Young, Florence, and Gordon C. Hicks, Sheffield, Ala., assignors to Tennessee Valley Authority, a corporation of the United States
Filed Dec. 8, 1960, Ser. No. 74,741
3 Claims. (Cl. 23—107)
(Granted under Title 35, U.S. Code (1952), sec. 266)

The invention described herein may be manufactured and used by or for the Government of the United States of America for governmental purposes without the payment of any royalties thereon or therefor.

Our invention relates to an improvement in the production of fertilizers from phosphoric acid and ammonia, and more particularly to an improved process for the production of high-analysis granular diammonium phosphate.

Monoammonium and diammonium phosphates are effective for fertilizer use because of their favorable physical properties and high concentration of plant foods and because they provide economical methods for fixing ammonia in solid form. Diammonium phosphate is the more attractive of the two materials for fixing ammonia because it fixes twice as much ammonia per unit of $P_2O_5$ as does monoammonium phosphate. Greenhouse tests have shown that diammonium phosphate is an effective fertilizer and is comparable to monoammonium phosphate as a source of nitrogen and phosphorus pentoxide. A review of agronomic data shows that monoammonium phosphate and diammonium phosphate are particularly suited for use on alkaline soils and on acid soils when their residual acidity is neutralized, e.g., with limestone.

Heretofore, monoammonium phosphate fertilizers have been produced commercially both in the United States and in Canada from ammonia and wet-process phosphoric acid by a process described in Industrial and Engineering Chemistry, vol. 41, 13–18 ff. (1949). That process is impractical, however for the production of diammonium phosphate. The high vapor of ammonia over diammonium phosphate solutions results in excessive loss of ammonia at the temperature utilized in that process.

Diammonium phosphate also has been produced by crystallizing from a mother liquor containing pure electric-furnace phosphoric acid. If wet-process phosphoric acid is substituted for the pure electric-furnace acid in this process, the large quantities of impurities contained in the wet-process acid precipitate, causing eventual gelling of the entire solution.

In U.S. Letters Patent 2,891,856, Getsinger et al., assigned to the assignee of the present invention, there is disclosed a process for the manufacture of diammonium phosphate from wet-process phosphoric acid and ammonia in which there is effective a separation of the impurities from the wet-process phosphoric acid prior to the production of the crystalline product a vacuum crystallization process.

Prior-art arrangements in processes of the above-mentioned type have proven to be operative; however, such processes require the expenditure of substantial amounts of capital for such relatively expensive equipment as large pressure vessels and vacuum-producing equipment. In addition, the processes shown in the prior art produce diammonium phosphate by the method of crystallizing the desired material from a mother liquor. This expedient of crystallizing salts from a mother liquor necessitates the use of phosphoric acids of relatively high concentrations, high rates of recycle in carrying out the process, and the expenditure of substantial amounts of fuel to provide heat for the evaporation of water associated with the process.

Our invention is directed to an improved process for producing high-analysis granular diammonium phosphate fertilizer materials in relatively inexpensive equipment such that the step of crystallizing the desired product from a mother liquor is not utilized, thereby eliminating the necessity for pressure vessels and vacuum-producing equipment. In our process either electric-furnace or wet-process phosphoric acid can be used, and the process is adaptable to acids of lower concentrations than those utilized in the prior art. In addition, substantially lower rates of recycle are required for control of granulation, the heat of chemical reaction is more fully utilized in the evaporation of water, the product granules have superior physical properties over the product of the prior-art processes, and the equipment is of conventional type already familiar to the fertilizer industry.

We have found that diammonium phosphate fertilizers of the type described may be produced by our process, which comprises partially ammoniating phosphoric acid in a preneutralizer vessel to form a slurry of ammonium phosphates therein; simultaneously introducing a stream of said slurry and particles of undersize product from a later-mentioned sizing step into the upper end of an inclined drum; therein maintaining a bed of rolling discrete particles of diammonium phosphate having a depth of about one-fourth to two-fifths the diameter of the drum; maintaining the surface of the bed of rolling particles at an inclination of about 30° to 45° to the horizontal diameter of the drum; passing each of the particles through the bed from end to end of the drum in a continuous curved path approximating a flattened helix of many turns, having upward-inclined turns adjacent to the inner surface of the drum and downward-inclined turns adjacent to the upper surface of the bed; passing the particles at lower speed through upward turns of the helical path than through descending turns; continuously introducing ammoniating fluids beneath the surface of the bed in a broad stream countercurrent to the upward movement of said particles in such path, the breadth of said stream extending substantially the entire length of the bed; recovering the ammonia evolved in said drum by passing the offgas through scrubbing means; returning the recovered ammonia from said scrubbing means to said preneutralizer vessel; withdrawing diammonium phosphate material from the lower end of said drum; cooling or drying said withdrawn material; introducing said withdrawn material into sizing means; returning product particles of predetermined size from said sizing means into the upper end of said drum; and withdrawing from said sizing means granular particles of high-analysis diammonium phosphate as product.

In U.S. Letters Patent 2,729,554, Nielsson, assigned to the assignee of the present invention, there is disclosed an inclined rotating drum apparatus similar to the reaction and mixing drum apparatus which we have found to be effective in carrying out our process. Nielsson's patent describes a process for ammoniating superphosphate and is not concerned with the production of monoammonium or diammonium phosphate by the reaction between phosphoric acid and ammonia. This process gives good results when ammoniated superphosphate is the desired product, but it cannot be used for the production of granular diammonium phosphate in that the direct introduction of ammoniating fluid and phosphoric acid into a rotating drum would result in the formation of a slurry, and not the formation of strong, granular diammonium phosphate material as taught by our invention.

We have overcome the difficulties inherent in apparatus and processes of the type described in the prior art to a substantial extent in the present invention by eliminating the step of crystallizing material from a mother liquor in relatively expensive pressure vessels and associated vacuum-forming equipment and by providing, in addition to the inclined rotating drum shown in the above-mentioned patent of Nielsson, a preneutralizing step for the formation of a slurry from ammonia and phosphoric acid and a scrubbing means for recovering ammonia from offgas evolved in the rotating drum. Furthermore, several new advantageous features over conventional prior-art processes are realized by the present invention.

Among these advantageous features are:

(1) The equipment required by our invention is of conventional type, simple, and economical.

(2) The heat of chemical reaction is utilized in the evaporation of water to the extent that drying of the product is not required when using acids containing as little as 40 percent $P_2O_5$. Efficient utilization of the chemical heat of reaction results in recycle requirements significantly lower than in many other granulation processes. Other processes require high-cost vacuum systems or high-fuel consumption units for the removal of water.

(3) Either electric-furnace or wet-process phosphoric acid may be used so that the process of our invention is adaptable to the use of acids of concentrations as low as 32 to 34 percent $P_2O_5$.

(4) The particle size of the product obtained can be readily controlled by the use of selective screening means.

It is therefore an object of the present invention to provide an improved process for producing fertilizers from phosphoric acid and ammonia.

Another object of the present invention is to provide an improved process for ammoniating phosphoric acid whereby a high degree of ammoniation of phosphoric acid is attained without high loss of ammonia.

Still another object of the present invention is to provide an improved process for the production of high-analysis diammonium phosphate in granular form through utilization of relatively inexpensive equipment, which process is characterized by the fact that no step of crystallizing the desired product material from a mother liquid is incorporate.

A further object of the present invention is to provide an improved process for the production of high-analysis diammonium phosphate in granular form by means of introducing a slurry of preneutralized phosphoric acid into an inclined rotating drum.

In carrying out the objects of our invention in one form thereof, we employ a rotating drum apparatus which is similar in design to that shown in the above-mentioned Nielsson patent. We have found it most economical to employ this type of equipment for continuous mixing operations. In addition, we have discovered that if we employ a preneutralizer vessel for partial preneutralization of phosphoric acid with ammonia to form a slurry of ammonium phosphates prior to the introduction of the material into the rotating drum, a granular product having highly desirable physical and chemical characteristics may be withdrawn from the lower end of the drum.

Our invention, together with further objects and advantages thereof, will be better understood from a consideration of the following description taken in connection with the accompanying drawings in which.

Figure 1:
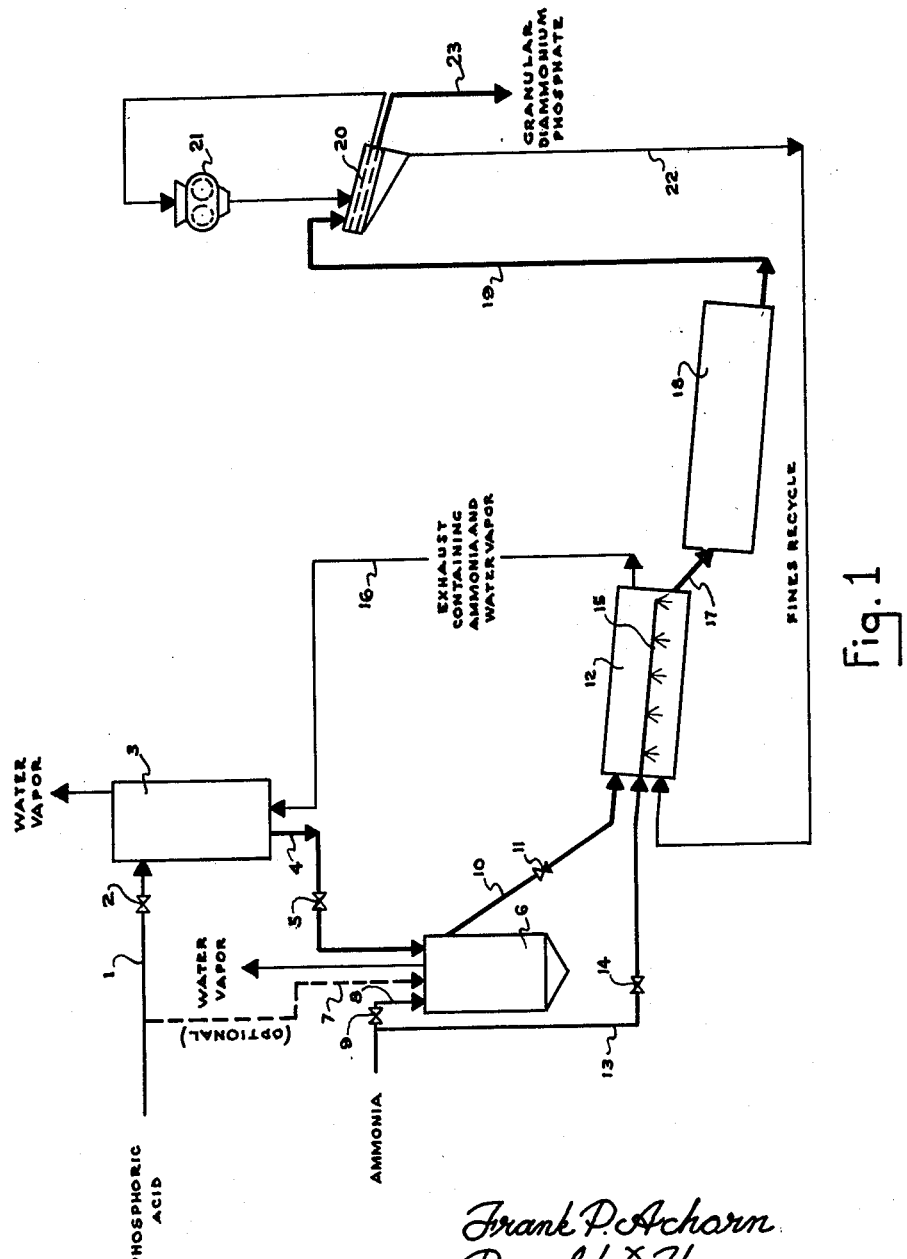
FIGURE 1 is a flowsheet illustrating principles of our novel process which result in a diammonium phosphate fertilizer material having the properties mentioned above.

Referring now more specifically to FIGURE 1, phosphoric acid from a source not shown is fed through line 1 and any suitable means for controlling the rate of flow 2 into scrubber means 3. This phosphoric acid, along with recovered ammonia from effluent offgases from a later-mentioned step, is fed through line 4 and any suitable means for controlling the rate of flow 5 into preneutralizer vessel 6. Alternatively, part of the phosphoric acid may be fed directly by line 7 into preneutralizer vessel 6. Ammoniating fluid is fed through line 8 and any suitable means for controlling the rate of flow 9 into preneutralizer vessel 6 wherein a slurry of ammonium phosphates is formed. The above-mentioned slurry of ammonium phosphates is fed through line 10 and any suitable means for controlling the rate of flow 11 by gravity through saw-toothed distributor 15 into inclined rotating drum 12, herein referred to as the ammoniator-granulator. Simultaneously, additional ammoniating fluid is fed through line 13 and any suitable means for controlling the rate of flow 14 into ammoniator-granulator 12 through distributor 15 located beneath the rolling bed of solids in the drum. The effluent offgas formed in ammoniator-granulator 12 is fed through line 16 to scrubber means 3. The granular diammonium phosphate product material is withdrawn from the lower end of ammoniator-granulator 12 and is fed through line 17 to a conventional rotary dryer which may be used for drying or for cooling the material discharged from granulator drum 12. The then cooled or dried material is fed via line 19 through sizing means generally illustrated as a set of screens 20 and a roll crusher 21. The fines from screen 20, of predetermined size, are fed via line 22 back to ammoniator-granulator 12. The granular diammonium phosphate product may be withdrawn from the sizing means via line 23.

In operating the process of our invention in the preferred embodiment shown in FIGURE 1, we have found that close control of the $NH_3:H_3PO_4$ mole ratio in the preneutralizer in the range of about 1.25 to 1.35 allows the production of a slurry of low moisture content which exhibits a low loss of ammonia and which is satisfactorily fluid for feeding by gravity into the ammoniator-granulator. When the mole ratio is maintained in this range, the chemical heat of reaction operates to efficiently evaporate a large part of the water from the system. In the ammoniator-granulator drum we have found that close control of $NH_3:H_3PO_4$ mole ratio at or about 2 gives a dry and nonsticky operating condition in the drum. For example, we have found that lowering the $NH_3:H_3PO_4$ mole ratio from 2 to 1.6 doubled the recycle requirement to prevent excessive agglomeration. Possibly this may be explained in that a mole ratio of about 2 is one of the points of minimum solubility of ammonium phosphate, and such an operating condition allows us to carry out the process with a minimum of recycle and to produce a material exhibiting highly desirable physical properties. In addition, recovery of the ammonia evolved as offgas from the drum allows completion of the ammoniation in the drum in a semisolid to solid state. In this manner of operation the chemical heat of reaction is utilized to evaporate all or nearly all (90% or more) of the water that must be removed from the system.

In the operation of the process of our invention according to the preferred embodiment shown in FIGURE 1, removal of impurities in wet-process phosphoric acid is not required. The iron and aluminum phosphates which remained dispersed throughout the product granules exhibit high capacity for holding moisture and improving the physical condition of the product.

It will be obvious from the above discussion that the equipment utilized in our process is simple and of conventional type and, in addition, all operation of the process is at atmospheric pressure, thus avoiding the use of expensive vacuum or pressure equipment.

In the preneutralization step, phosphoric acid produced by either the wet process or the electric-furnace process is suitable, and we have found that acid concentrations in the range of about 30 to 76 percent $P_2O_5$ may be utilized. When an acid concentration of about 43 percent $P_2O_5$ is used in our process, the slurry is concentrated to a maximum degree consistent with good fluidity, utilizing only the heat of chemical reaction. The temperature in the preneutralizer may be maintained in the range from about 220° to 280° F., with 250° F. giving the maximum slurry concentration obtainable without impairing fluidity. We have found that the $NH_3:H_3PO_4$ mole ratio in the preneutralizer in most cases should be between 0.5 and 1.5; however, the best operation of our process occurs when this mole ratio is about 1.3. At this 1.3 ratio the loss of ammonia is minimized and sufficient evaporation of water and good fluidity are attained.

In the ammoniator-granulator drum we have found that the recycle rate may be from about 2 to 5 pounds of undersize material per pound of product and that the best operation in the drum is obtained when a recycle rate of about 2.5 to 3 pounds of undersize material per pound of product is used. At this recycle ratio we can obtain good particle size of product without excessive throughput of material. In addition, the production of small granules increases absorption of ammonia and rate of drying and reduces the proportion of product to be crushed. The $NH_3:H_3PO_4$ ratio maintained in the drum may be in the range from about 1.6 to 2.1, a mole ratio of about 2 yielding the most complete ammoniation obtained without excessive evolution of ammonia from the bed. In addition, the temperature in the drum may be maintained in the range of about 150° F. to about 210° F., the preferred temperature of 190° to 200° F. giving a good rate of moisture removal without excessive evolution of the ammonia.

The scrubbing liquor consists of water and phosphoric acid which is subsequently fed to the preneutralizer. We have found that our process operates best when all of the acid for the process is introduced into the scrubber; if desired, however, a portion of the phosphoric acid may be directly introduced into the preneutralizer without being fed through the scrubber. We have observed that when all of the acid for the process is introduced into the scrubber, there is essentially complete recovery of all ammonia evolved in the drum.

The product may be cooled or dried, and sized in conventional equipment such as a rotary dryer and vibrating screens. We have found that a moderate drying temperature gives material of the lowest moisture content, thereby reducing the recycle ratio required in the ammoniation-granulation step. A dryer temperature of about 180° F. yields a product of low moisture content, reduces losses of ammonia, and requires very little consumption of fuel for operating the dryer.

Oversize material from the dryer is pulverized and screened, and the resulting undersize material is recycled to the granulator drum. We have found that sizing screens of about 6 and 10 mesh provide sufficient material for recycling to the drum and yield an end product that is very closely sized granular fertilizer having excellent physical properties and high plant-food content.

Detailed descriptions of equipment and the effects of variables within each step of the process are given in the following section.

SCRUBBER

The scrubber consisted of a 2- by 10-foot cylindrical tower containing 8 feet of wood grip-type packing. The scrubbing liquor was dispersed over the packing by a double cone distributor. The usual recirculation rate was 10 gallons per minute. The gas from the ammoniator-granulator entered the tower at a temperature of about 120° F. and at a rate of about 350 cubic feet per minute.

In some tests, the proportion of acid fed to the scrubber was controlled to maintain an $NH_3:H_3PO_4$ mole ratio of about 1 in order to reduce corrosion of the mild steel; the remainder of the acid was fed to the preneutralizer tank. In the other tests, all of the acid was fed to the scrubber. Best ammonia recovery occurred when all of the acid was fed to the scrubber. Also, control of the operation was simplified. The effects of the pH, temperature, and concentration of the scrubbing liquor on the recovery of ammonia are shown in the following tabulation.

| Scrubbing liquor: | All acid to scrubber | | Part of acid to scrubber | | | | |
|---|---|---|---|---|---|---|---|
| pH | <1 | <1 | 3.0 | 3.2 | 3.3 | 3.5 | 3.5 | 3.7 |
| $NH_3:H_3PO_4$ mole ratio | 0.03 | 0.06 | | 0.90 | 0.99 | 0.89 | 1.02 | |
| Water content,[1] percent | 25 | 21 | | 65 | 77 | 69 | 70 | |
| Temperature, °F. | 116 | 116 | 146 | 151 | 136 | 139 | 124 | 112 |
| Gas temperature, °F.: | | | | | | | | |
| Entering | 100 | 108 | 121 | 127 | 122 | 125 | 112 | 118 |
| Leaving | 109 | 114 | 142 | 148 | 140 | 145 | 119 | 113 |
| Loss of $NH_3$, percent of total to process | 0.1 | 0.4 | 0.8 | 2.6 | 1.4 | 2.2 | 3.7 | 0.7 |

[1] Moisture content was estimated from chemical composition.

The loss of ammonia in the scrubber offgas increased with increase in pH and temperature of the scrubbing liquor. Also, the fluidity of the liquor probably is a factor in ammonia absorption. The water content necessary to give a scrubber effluent that could be handled readily varied widely with the pH or $NH_3:H_3PO_4$ mole ratio; at a pH of less than 1, about 20 to 25 percent water was needed, while at a pH of 3 to 4 about 70 to 80 percent water was needed.

Corrosion of mild steel was severe with hot liquor (120° to 150° F.) at a pH as high as 3 to 4; therefore, stainless steel is recommended for construction of the scrubbing system. The higher efficiency of ammonia recovery and simplified operation when all of the acid was fed to the scrubber make this method of operation desirable.

PRENEUTRALIZER VESSEL

The effluent from the scrubber was fed to the preneutralizer, which consisted of a 14-inch-diameter open tank 3½ feet high equipped with an agitator. The ammonia and the acid effluent were fed through separate ¼-inch standard pipe size circular spargers with perforations directed toward the center of the tank. The ammonia sparger was positioned below the acid sparger. Stainless steel was used throughout for construction of the preneutralizer system. The slurry produced in the preneutralizer was discharged through a side overflow pipe at a 2-foot level. The tank was equipped with a hood and air-ejector system for exhausting the moisture-laden exhaust gases.

Figure 2:
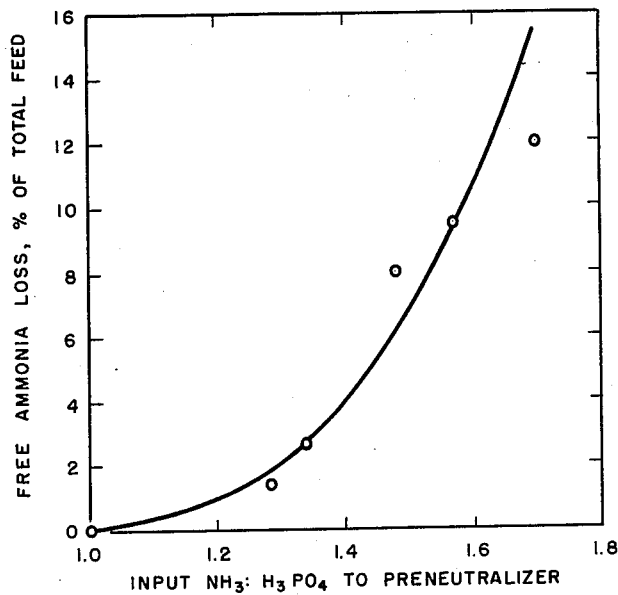
FIGURE 2 is a graphical illustration showing the effect of the input free $NH_3:H_3PO_4$ mole ratio on ammonia loss in the preneutralizer vessel.

It was found that an $NH_3:H_3PO_4$ mole ratio of about 1.3 could be obtained in the preneutralizer tank without an excessive loss of ammonia. The effect of input $NH_3:H_3PO_4$ mole ratio on loss of ammonia is shown in FIGURE 2. These values were obtained when feeding about 35 units of $P_2O_5$ per hour as electric-furnace acid. Loss of ammonia is shown as percent of the ammonia required to give diammonium phosphate. To keep the slurry sufficiently fluid to permit distribution in the ammoniator-granulator drum, it was necessary to dilute the acids containing about 54 percent $P_2O_5$ so that the slurry leaving the preneutralizer contained 15 to 24 percent water. The amount of water added was equivalent to the use of acid containing 37 to 43 percent $P_2O_5$. About 300 pounds of water per ton of product were evaporated. Evaporation of water controlled the temperature in the preneutralizer in the range of 235° to 250° F. The pH of the solution varied from 5 to 5.5 with an $NH_3:H_3PO_4$ mole ratio of 1.3 to 1.35.

AMMONIATOR-GRANULATOR DRUM

The pilot-plant ammoniator-granulator drum was 3 by 3 feet and contained 9-inch retaining rings on each end. It was operated at 20 revolutions per minute. The slurry from the preneutralizer flowed by gravity through a saw-toothed distributor located above the rolling bed of solids in the drum. About 225 pounds of anhydrous liquid ammonia per ton of product were added beneath the bed in the drum through a 30-inch six-slot type distributor normally used for feeding ammonia or ammoniating solution in production of conventional mixed fertilizer. Granulation was controlled primary by rate of recycle fed, which ranged from 2 to 3.5 pounds per pound of product when using concentrated wet-process acid. A recycle rate of 3.7 pounds per pound of product was used when feeding electric-furnace acid.

In addition to the recycle rate, other factors affecting granulation were (1) $NH_3:H_3PO_4$ mole ratio in the drum, (2) evaporation rate in the drum, (3) particle size and moisture content of recycle, and (4) slurry composition. Less agglomeration and more evaporation occurred when the $NH_3:H_3PO_4$ mole ratio was 2 than when it was 1.90 or lower. Best results were obtained when granulation was controlled so that less than 10 percent of the granulator product was plus 6 mesh in size and more than 50 percent was minus 10 mesh in size. Control of granulation to give this size resulted in greater retention of ammonia in the ammoniator-granulator and more evaporation of water in the drum and the rotary dryer or cooler. Also, most of the recycle requirement could be provided by the minus 10-mesh fines from the screens and the amount of oversize to be crushed was small. The ammonia evolved from the drum to be recovered in the scrubber ranged from 2 to 12 percent of the total fed to the process. Twenty-five to 49 percent of the total water introduced in the process was removed by heat of reaction in the ammoniator-granulator drum. When cool recycle was fed, the temperature in the drum was about 10° F. lower (183° v. 193° F.) and about 25 percent less water was evaporated in the drum (27 v. 36% of the total water for the process). This required a somewhat higher recycle ratio for control of granulation.

EFFECT OF ACID CONCENTRATION

Tests were made to indicate the effect of the acid concentration used on recycle requirements. The approximate recycle rates required for various acid concentrations are given below.

| Acid concentration, percent $P_2O_5$: | Recycle ratio, lb./lb. product |
|---|---|
| 43 | 2.7 |
| 39 | 3.0 |
| 37 | 3.5 |
| 34 | 5.0 |
| 32 | 8.5 |

The variations in acid concentration were studied by feeding water with 54 percent ($P_2O_5$) wet-process acid. Drying was used in these tests; if drying were not used, the recycle rate would be slightly higher at the higher acid concentrations and much higher at the lower concentrations. In practice, the feed acid could be a blend of filter acid (30% $P_2O_5$) and concentrated acid (54% $P_2O_5$). The additional impurities in the 30 percent acid would be expected to affect the operating characteristics. The higher proportion of solids in the weak acid might impose some problems due to settling out and would affect the consistency of the slurry in the preneutralizer.

PRODUCTION OF POTASH GRADES

This process also is adaptable to the production of three-component fertilizers by including potash in the feed materials. In one test, potassium chloride was included to produce the NPK grade 14-35-14. Operation was good and the recycle ratio was decreased to 1 by the inclusion of potash in this grade. The lower recycle ratio would allow considerably higher rates of production for the potash grades. Other grades such as 10-25-25 could be made simply by including potash. By the use of ammoniating solution to provide supplementary nitrogen, other NPK ratios such as 17-17-17 containing higher proportions of nitrogen could be produced.

DRYER OR COOLER AND SIZE-CLASSIFYING SYSTEM

A conventional rotary dryer was used for drying or for cooling the material as discharged from the granulator drum; it was 3 feet in diameter by 24 feet long and contained eight 8-inch radial flights which extended virtually the full length of the dryer. A countercurrent flow of air was used for drying and for cooling the product. When the product was dried, 1800 cubic feet per minute of air entered at 240° to 270° F. and left at 180° to 210° F. The product reached temperature of 180° to 210° F. Loss of ammonia in the dryer varied from 2 to 4 percent of the total and increased with increased temperature of the product. Other factors that increased the loss of ammonia were increases of $NH_3:H_3PO_4$ mole ratios and increases in the moisture contents of the products. When the product was cooled without drying, 500 cubic feet per minute of air entered at 85° F. and was exhausted at 135° to 140° F. The product was cooled at 80° to 85° F. Loss of ammonia was about 1.5 percent.

The product was sized on double-deck screens having 6- and 10-mesh openings. The oversize material was pulverized in a chain mill and rescreened. This equipment remained relatively clean during processing.

STORAGE PROPERTIES

After 30 days' storage, the unconditioned products which had been dried to 0.6 to 1 percent moisture had either no bag set or a very light set and contained no lumps after one drop from waist height. Over-all bagging and handling properties were considered to be excellent.

The material that was cooled without prior drying contained about 2 percent moisture. After 30 days' storage the unconditioned product had a medium bag set and contained about 15 to 20 percent ½-inch lumps after one drop and 1 percent lumps after four drops. After 30 days' storage the material that was dusted with 2 percent conditioner had only a light set and no lumps after one drop from waist height.

In order that those skilled in the art may better understand how the present invention can be practiced, the following examples are given by way of illustration and not by way of limitation.

*Example 1*

Several pilot-plant tests were made of the various individual steps and of the complete integrated process. The pilot plant which was constructed as shown in FIGURE 1 had a capacity of 0.5 to 0.75 ton per hour of finished sized product. It consisted of a preneutralizer tank, a rotary ammoniator-granulator drum, a scrubber, and auxiliary equipment for feeding the raw materials at controlled rates and for crushing and sizing of the product. In tests of the preneutralizing step alone, the optimum $NH_3:H_3PO_4$ mole ratio for high rates of evaporation of water, low loss of ammonia, and satisfactory fluidity of slurry were established. The following data illustrate these results when feeding 46 percent ($P_2O_5$) phosphoric acid and anhydrous liquid ammonia.

| Moles $NH_3$/mole $H_3PO_4$: | Loss of $NH_3$, percent of total feed |
|---|---|
| 1.70 | 14.5 |
| 1.57 | 12.8 |
| 1.48 | 11.1 |
| 1.35 | 3.5 |
| 1.30 | 1.5 |
| 1.10 | 1.0 |

The evaporation rate increased with increased $NH_3:H_3PO_4$ mole ratio; however, loss of ammonia also increased steadily as this ratio was increased. With an $NH_3:H_3PO_4$ mole ratio of 1.30, the rate of evaporation of water was 300 pounds per ton of product or higher and loss of ammonia was only 1.5 percent. The preneutralized slurry was more fluid than that produced at lower mole ratios and could be fed by gravity and distributed easily in the ammoniator-granulator drum.

*Example II*

Tests were made in the pilot plant to study the effect of feeding only part or all of the acid required in the process to the scrubber. The data in the following tabulation show results of typical tests. Test A was made with about one-fourth of the acid fed to the scrubber and the remainder fed directly to the preneutralizer. Test B was made with all of the acid fed to the scrubber before entering the preneutralizer.

|  | Test A | Test B |
|---|---|---|
| Feed rate to scrubber and preneutralizer, lb./ton of product: | | |
| $P_2O_5$— | | |
| To scrubber | 196 | 947 |
| Directly to preneutralizer | 776 | |
| $NH_3$ (anhydrous liquid) | 278 | 293 |
| $H_2O$ | 925 | 740 |
| Equivalent acid concentration, percent $P_2O_5$ | 41 | 43 |
| Scrubber conditions: | | |
| Inlet gas temperature, °F | 120 | 100 |
| Exit gas temperature, °F | 128 | 109 |
| Liquor— | | |
| Temperature, °F | 130 | 116 |
| pH | 3.4 | <1 |
| Chemical analysis, percent: | | |
| N | 3.4 | 0.3 |
| $P_2O_5$ | 16.9 | 48.0 |
| $H_2O$ | 70 | 25 |
| $NH_3:H_3PO_4$ mole ratio | 1.02 | 0.03 |
| $NH_3$ absorption efficiency, percent | 84 | 96 |
| Preneutralizer conditions: | | |
| Liquor— | | |
| Temperature, °F | 233 | 240 |
| pH | 5.4 | 4.8 |
| Chemical analysis, percent: | | |
| N | 11.1 | 11.6 |
| $P_2O_5$ | 44.7 | 44.1 |
| $H_2O$ | 20 | 19 |
| $NH_3:H_3PO_4$ mole ratio | 1.26 | 1.33 |
| Evaporation, percent of total input | 51 | 43 |
| Ammonia loss from scrubber and preneutralizer, percent of total feed | 3.7 | 1.7 |

Good results were obtained in both tests, but control was easier when all of the acid was fed through the scrubber as in test B. Also, the scrubbing efficiency increased from 84 percent when part of the acid was fed to the scrubber to 96 percent when all of the acid was fed through the scrubber. This resulted in a decrease in combined loss of ammonia in the scrubber and preneutralizer from 3.7 percent in test A to only 1.7 percent in test B.

*Example III*

A large number of tests of the entire process were made in which ammoniation of the preneutralized slurry was completed and granulation was accomplished simultaneously in a rotary drum (TVA ammoniator-type) to produce a granular diammonium phosphate product. The completely ammoniated granular product was passed through either a rotary dryer or cooler prior to screening at minus 6 plus 10 mesh. The minus 6- plus 10-mesh fraction was retained as product, while the minus 10 mesh was returned to the ammoniator as recycle. The oversize (+6 mesh) was crushed in a chain mill and returned with the fines as recycle. The tabulation below shows typical data for a test in which drying was used (test C) and one in which only cooling was employed (test B). The data for test B, when combined with those in the tabulation under Example II, provide typical complete data for the process.

|  | Test C (Product dried) | Test B (Product cooled) |
|---|---|---|
| Production rate of sized diammonium phosphate, ton/hr | 0.5 | 0.5 |
| Feed rate to ammoniator drum, lb./ton of product: | | |
| Ammonia (anhydrous liquid) | 213 | 214 |
| Slurry from preneutralizer | 2,264 | 2,148 |
| Recycled material | 5,409 | 6,683 |
| Recycle ratio, lb./lb. of product | 2.7 | 3.3 |
| Moisture content, percent: | | |
| Recycled material | 0.6 | 1.3 |
| Total feed to ammoniator | 6.7 | 5.4 |
| Ammoniator product | 2.4 | 3.2 |
| Dryer or cooler product | 0.8 | 1.9 |
| Temperature, °F.: | | |
| Recycled material | 142 | 82 |
| Ammoniator product | 191 | 178 |
| Dryer or cooler product | 184 | 85 |
| Ammonia evolved, percent of total fed to process | 7.0 | 2.1 |
| Evaporation, percent of total water fed to process: | | |
| In ammoniator | 43 | 25 |
| In dryer or cooler | 16 | 14 |
| Screen analysis (Tyler), percent: | | |
| Dryer or cooler product— | | |
| +6 mesh | 6.4 | 9.6 |
| −6 +10 mesh | 35.1 | 42.2 |
| −10 mesh | 58.5 | 48.2 |
| Chemical analysis of product, percent: | | |
| N | 19.9 | 19.7 |
| $P_2O_5$ | 50.4 | 49.6 |
| $H_2O$ | 0.9 | 2.0 |
| $NH_3:H_3PO_4$ mole ratio: | | |
| In feed materials, including recycle | 2.05 | 2.05 |
| Ammoniator product | 2.00 | 2.01 |
| Dryer or cooler product | 2.00 | 2.02 |
| Loss of $NH_3$ from dryer or cooler, percent | 1.6 | 1.5 |

Operation generally was good in both tests, and the product had satisfactory storage and handling properties. When moderate drying was employed (test C), the recycle ratio required for control of granulation was lower than when only cooling was used (2.7 v. 3.3); this would give a somewhat higher production rate in a given size unit. Also, the storage and bagging properties of the dried product were considerably better, although the cooled product had physical properties as good as most granular fertilizers.

While we have shown and described the particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secure by Letters Patent of the United States is:

1. A process for the production of high-analysis granular diammonium phosphate fertilizer material which comprises continuously ammoniating wet-process phosphoric acid containing about 30 to about 76 weight percent $P_2O_5$ in a preneutralizer vessel to form a slurry of ammonium phosphates therein; maintaining an $NH_3:H_3PO_4$ mole ratio in the range of about 1.3 to about 1.5 in said preneutralizer vessel; introducing a stream of said slurry, a stream of ammoniating fluid, and particles of undersize product from a later-mentioned sizing step into the upper end of an inclined rotating drum; therein maintaining a bed of rolling discrete particles of diammonium phosphate; continuously introducing additional ammoniating fluid beneath the surface of said bed in a broad stream countercurrent to the upward movement of said particles in such path, the breadth of said stream extending substantially the entire length of said bed; maintaining an $NH_3:H_3PO_4$ mole ratio of about 2 in said drum; recovering the ammonia evolved in said drum by passing the offgas through scrubbing means; returning the recovered ammonia from said scrubbing means to said preneutralizer vessel; withdrawing diammonium phosphate material from the lower end of said drum; introducing said withdrawn material into sizing means; returning particles of predetermined size from said sizing means into the upper end of said drum; and withdrawing from said sizing means granular particles of diammonium phosphate as product, said process being characterized by the fact that substantially all of the heat necessary to evaporate the necessary amount of water from the system for producing said granular product is supplied by the chemical heat of reaction of the reactants, thereby substantially eliminating the necessity for supplying external heat to the system comprising said process.

2. A process for the production of high-analysis granular diammonium phosphate fertilizer material which comprises continuously ammoniating wet-process phosphoric acid containing about 30 to about 76 weight percent $P_2O_5$ in a preneutralizer vessel to form a slurry of ammonium phosphates therein; maintaining an $NH_3:H_3PO_4$ mole ratio in the range of about 1.3 to about 1.5 in said preneutralizer vessel; maintaining a temperature of about 220° F. to about 280° F. in said preneutralizer vessel; introducing a stream of said slurry, a stream of ammoniating fluid, and particles of undersize product from a later-mentioned sizing step into the upper end of an inclined rotation drum; therein maintaining a bed of rolling discrete particles of diammonium phosphate; continuously introducing additional ammoniating fluid beneath the surface of said bed in a broad stream countercurrent to the upward movement of said particles in such path, the breadth of said stream extending substantially the entire length of said bed; maintaining an $NH_3:H_3PO_4$ mole ratio of about 2 in said drum; recovering the ammonia evolved in said drum by passing the offgas through scrubbing means; returning the recovered ammonia from said scrubbing means to said preneutralizer vessel; withdrawing diammonium phosphate material from the lower end of said drum; cooling said withdrawn material to a temperature of less than about 180° F.; introducing said withdrawn material into sizing means; returning particles of predetermined size from said sizing means into the upper end of said drum; and withdrawing from said sizing means granular particles of diammonium phosphate as product, said process being characterized by the fact that substantially all of the heat necessary to evaporate the necessary amount of water from the system for producing said granular product is supplied by the chemical heat of reaction of the reactants, thereby substantially eliminating the necessity for supplying external heat to the system comprising said process.

3. A process for the production of high-analysis granular diammonium phosphate fertilizer material which comprises continuously ammoniating wet-process phosphoric acid containing about 30 to about 76 weight percent $P_2O_5$ in a preneutralizer vessel to form a slurry of ammonium phosphates therein; maintaining an $NH_3:H_3PO_4$ mole ratio in the range of about 1.3 to about 1.5 in said preneutralizer vessel; maintaining a temperature of about 220° F. to about 280° F. in said preneutralizer vessel; introducing a stream of said slurry, a stream of ammoniating fluid, and particles of undersize product from a later-mentioned sizing step into the upper end of an inclined rotating drum; therein maintaining a bed of rolling discrete particles of diammonium phosphate; continuously introducing additional ammoniating fluid beneath the surface of said bed in a broad stream countercurrent to the upward movement of said particles in such path, the breadth of said stream extending substantially the entire length of said bed; maintaining an $NH_3:H_3PO_4$ mole ratio of about 2 in said drum; maintaining a temperature of about 170° F. to about 210° F. in said drum; recovering the ammonia evolved in said drum by passing the offgas through scrubbing means; returning the recovered ammonia from said scrubbing means to said preneutralizer vessel; withdrawing diammonium phosphate material from the lower end of said drum; introducing said withdrawn material into sizing means; returning particles of predetermined size from said sizing means into the upper end of said drum; and withdrawing from said sizing means granular particles of diammonium phosphate as product, said process being characterized by the fact that substantially all of the heat necessary to evaporate the necessary amount of water from the system for producing said granular product is supplied by the chemical heat of reaction of the reactants, thereby substantially eliminating the necessity for supplying external heat to the system comprising said process.

References Cited in the file of this patent

UNITED STATES PATENTS

| | | |
|---|---|---|
| 1,822,040 | Klugh et al. | Sept. 8, 1931 |
| 1,999,026 | Tramm et al. | Apr. 23, 1935 |
| 2,384,773 | Shoeld | Sept. 11, 1945 |
| 2,384,856 | Ten Eyck et al. | Sept. 18, 1945 |
| 2,885,263 | Peet | May 5, 1959 |
| 2,885,278 | Mortenson | May 5, 1959 |
| 2,902,342 | Kerley | Sept. 1, 1959 |
| 2,917,367 | Hodges et al. | Dec. 15, 1959 |
| 2,946,655 | Helm et al. | July 26, 1960 |
| 2,963,359 | Moore et al. | Dec. 6, 1960 |
| 3,053,622 | Bostwick | Sept. 11, 1962 |

OTHER REFERENCES

Waggaman: Phosphoric Acid, Phosphates, and Phosphatic Fertilizers, Reinhold, N.Y., 1952, pages 602–603.

UNITED STATES PATENT OFFICE
CERTIFICATE OF CORRECTION

Patent No. 3,153,574                      October 20, 1964

Frank P. Achorn et al.

It is hereby certified that error appears in the above numbered patent requiring correction and that the said Letters Patent should read as corrected below.

Column 1, line 57, for "effective" read -- effected --; line 59, after "product" insert -- using --; column 3, line 46, for "liquid" read -- liquor --; line 47, for "incorporate" read -- incorporated --; column 5, line 70, for "grip-type" read -- grid-type --; column 7, line 12, for "primary" read -- primarily --; column 11, line 18, for "rotation" read -- rotating --.

Signed and sealed this 2nd day of March 1965.

(SEAL)
Attest:

ERNEST W. SWIDER                      EDWARD J. BRENNER
Attesting Officer                        Commissioner of Patents